No. 763,821. PATENTED JUNE 28, 1904.
W. V. WESSON.
NUT LOCK.
APPLICATION FILED MAR. 19, 1904.
NO MODEL.
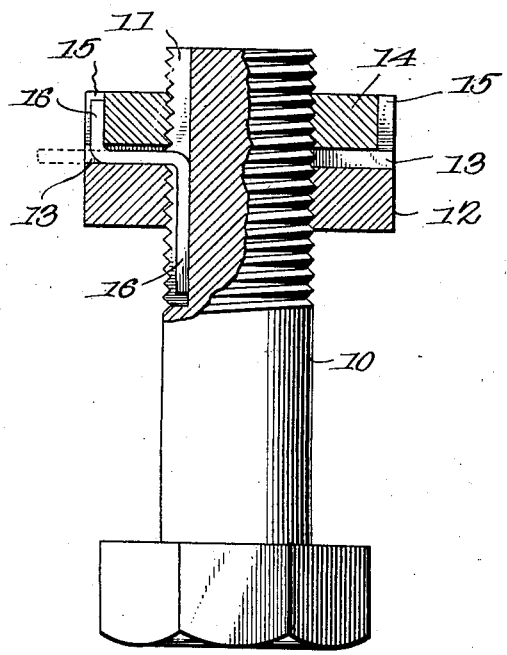
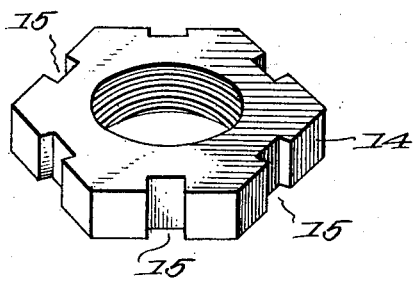
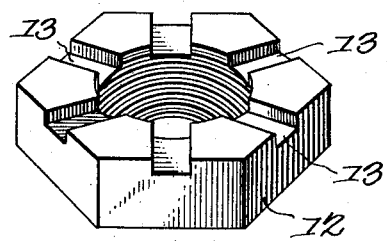
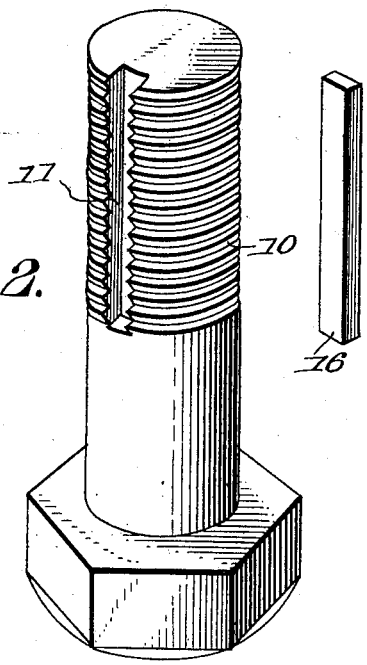
Witnesses
E. T. Stewart
C. N. Woodward
Washington V. Wesson, Inventor.
by C. A. Snow & Co.
Attorneys No. 763,821. Patented June 28, 1904.

UNITED STATES PATENT OFFICE.

WASHINGTON VANN WESSON, OF ATTALLA, ALABAMA.

NUT-LOCK.

SPECIFICATION forming part of Letters Patent No. 763,821, dated June 28, 1904.

Application filed March 19, 1904. Serial No. 198,937. (No model.)

*To all whom it may concern:*

Be it known that I, WASHINGTON VANN WESSON, a citizen of the United States, residing at Attalla, in the county of Etowah and State of Alabama, have invented a new and useful Nut-Lock, of which the following is a specification.

This invention relates to devices for preventing nuts from rotating backwardly upon bolts, and has for its object to simplify and improve the construction and produce a device of this character which may be inexpensively constructed, easily applied and operated, and by means of which the nuts may be rigidly connected to the bolt and effectually prevented from backward rotation no matter how severe the jars and concussions to which it is subjected may be.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages, and the right is therefore reserved of making all the changes and modifications which fairly fall within the scope of the invention and the claim made therefor.

In the drawings thus employed, Figure 1 is a sectional view of a bolt and its nuts with the improvement applied. Fig. 2 represents perspective views of the parts disconnected.

In the improved device is comprised a bolt 10, provided with a longitudinal channel or keyway 11 transversely of the threads, a base-nut 12, having radial recesses 13 in its outer face, a guard-nut 14, having peripheral recesses 15 for registration with the recesses 13 in the base-nut, and a malleable key 16 for engagement with the channel and bendable for engagement with the recesses.

The channel 11 will be of sufficient depth to receive the key 16 entirely beneath its threads, so that the nuts can be freely rotated over the key after it is inserted into the keyway or channel or so that the key can be inserted into the channel after the base-nut has been positioned upon the bolt. By this arrangement it will be noted the only mutilation of the threads of the bolt 10 is that made by the comparatively small channel or keyway 11, and no mutilation or weakening of the threads of the nuts is required.

In applying the device the base-nut 12 is set home against the structure to be held and set with one of its recesses 13 opposite the channel, and by providing a plurality of the channels it is obvious it will be necessary to rotate the nut a fraction of a revolution only to bring it into operative position. The key 16 is then inserted into the channel 11 and the projecting portion bent outward into the registering recess 13 and the guard-nut placed on the bolt and rotated until it engages the base-nut with one of its peripheral recesses 15, registering with the recess 13, which contains the outwardly-bent portion of the key. The surplus portion or free end of the key is then bent into the registering recess 15, as shown in Fig. 1. By this simple means a threefold locking means is provided between the nuts and bolt. First, the base-nut 12 is effectually "locked" fast to the bolt by the first outward bending of the key; second, the base-nut is further supported by the guard-nut 14, acting as a "jam-nut" and likewise holding the bent key from displacement, and, third, the guard-nut is firmly held from rotation by the second bending of the key into the peripheral recess 15, as above noted.

The recesses in the nuts and the keyway or channel may be very cheaply and quickly formed in the nuts and bolts when being manufactured and without materially increasing the expense, and the expense of the keys 16 will be very slight, as they are of the same size throughout and can be cut into the required lengths from wire or in an emergency an ordinary section of wire or even a wire nail of proper size may be employed as a key.

The nuts may be easily released when required by reversing the bends in the key, and the same key may be used repeatedly if constructed of sufficiently tough malleable metal.

The device is very simple in construction and can be readily applied to all the various forms and sizes of bolts and nuts, and to those employed for all purposes requiring the application of a locking attachment to the nuts. In its precise details of construction it presents an improvement over prior devices of a similar character.

Having thus described the invention, what is claimed is—

A nut-lock comprising a bolt having a longitudinal channel extending along the threaded portion thereof, a nut thereon having unbroken threads and one or more radial slots in its upper surface, a locking-nut having one or more peripheral slots, and a locking-key capable of lying entirely within the longitudinal channel and of being bent outward therefrom to engage one of the radial slots in the nut with unbroken threads, and one of the peripheral slots in the locking-nut.

In testimony that I claim the foregoing as my own I have hereto affixed my signature in the presence of two witnesses.

WASHINGTON VANN WESSON.

Witnesses:
ALTO VELO LEE, Jr.,
A. R. BRINDLEY.